US009860266B2

(12) United States Patent
Chen et al.

(10) Patent No.: US 9,860,266 B2
(45) Date of Patent: Jan. 2, 2018

(54) PREVENTING MESSAGING ATTACKS

(71) Applicant: BlackBerry Limited, Waterloo (CA)

(72) Inventors: Shu-Lin Chen, Kanata (CA); Michael Eoin Buckley, Grayslake, IL (US); Shirook M. Ali, Milton (CA); Paritosh Anthwal, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/922,875

(22) Filed: Oct. 26, 2015

(65) Prior Publication Data
US 2017/0118238 A1    Apr. 27, 2017

(51) Int. Cl.
| H04L 29/06 | (2006.01) |
| G06F 21/57 | (2013.01) |
| H04W 4/12 | (2009.01) |
| H04W 12/12 | (2009.01) |
| H04W 88/02 | (2009.01) |

(52) U.S. Cl.
CPC ........ H04L 63/1433 (2013.01); G06F 21/577 (2013.01); H04L 63/02 (2013.01); H04L 63/08 (2013.01); H04L 63/1416 (2013.01); H04W 4/12 (2013.01); H04W 12/12 (2013.01); H04W 88/02 (2013.01)

(58) Field of Classification Search
CPC ..... H04L 63/1433; H04L 63/02; H04L 63/08; H04L 63/1416; H04W 88/02; H04W 12/12; H04W 4/12; G06F 21/577
USPC .......................................................... 726/3
See application file for complete search history.

(56) References Cited

U.S. PATENT DOCUMENTS

| 2005/0188222 A1 | 8/2005 | Motsinger |
| 2005/0198099 A1 | 9/2005 | Motsinger |
| 2006/0128406 A1 | 6/2006 | Macartney |
| 2007/0275741 A1 | 11/2007 | Bian |
| 2008/0095361 A1* | 4/2008 | Wifvesson ............ H04L 9/0841 380/44 |

(Continued)

FOREIGN PATENT DOCUMENTS

| FR | 2959380 | 10/2011 |
| GB | 2515326 | 12/2014 |

OTHER PUBLICATIONS

Google Report: Android Security; 2014 Year in Review; Apr. 2015; 44 pages.

(Continued)

Primary Examiner — Michael S McNally
(74) Attorney, Agent, or Firm — Fish & Richardson P.C.

(57) ABSTRACT

Systems, methods, and software can be used to prevent messaging attacks. In some aspects, a scanning short message is sent to a UICC associated with a mobile device. A response short message is received in response to the scanning short message. The UICC is determined to be at risk to attacks based on the response short message. In response to determining that the UICC is at risk to attacks, a notification is generated. In some cases, the notification is sent to a DMS. Alternatively or in combination, the notification is displayed on the mobile device. In response to determining that the UICC is at risk to attacks, a firewall application is installed on the mobile device. The firewall application is configured to process an incoming short message addressed to the UICC.

17 Claims, 8 Drawing Sheets

(56) References Cited

U.S. PATENT DOCUMENTS

| | | | |
|---|---|---|---|
| 2008/0114978 A1* | 5/2008 | Lehtovirta | H04L 63/061 713/155 |
| 2008/0127345 A1* | 5/2008 | Holtmanns | H04L 12/585 726/23 |
| 2008/0148407 A1 | 6/2008 | Katkar | |
| 2008/0222736 A1 | 9/2008 | Boodaei | |
| 2010/0011029 A1 | 1/2010 | Niemelae | |
| 2011/0173450 A1 | 7/2011 | Knobbe | |
| 2012/0036571 A1 | 2/2012 | Yoo | |
| 2012/0151585 A1 | 6/2012 | Lamastra | |
| 2012/0233696 A1* | 9/2012 | Zeng | G06F 9/00 726/24 |
| 2013/0227684 A1 | 8/2013 | Troyansky | |
| 2013/0291100 A1 | 10/2013 | Ganapathy | |
| 2014/0075567 A1 | 3/2014 | Raleigh | |
| 2014/0150064 A1* | 5/2014 | Wifvesson | H04L 63/123 726/3 |
| 2014/0179360 A1 | 6/2014 | Jackson | |
| 2015/0011186 A1 | 1/2015 | Yoon | |
| 2015/0180829 A1* | 6/2015 | Yu | G06F 21/31 726/11 |
| 2015/0244698 A1 | 8/2015 | Zheng | |
| 2015/0271138 A1 | 9/2015 | Lukin et al. | |
| 2015/0319152 A1* | 11/2015 | Chastain | H04L 63/08 726/4 |
| 2015/0381604 A1 | 12/2015 | Troyansky | |
| 2016/0006753 A1 | 1/2016 | McDaid | |
| 2016/0065600 A1 | 3/2016 | Lee | |
| 2016/0094574 A1 | 3/2016 | Hsueh | |
| 2016/0198341 A1 | 7/2016 | Fransen | |
| 2016/0232349 A1 | 8/2016 | Baeder | |
| 2016/0232353 A1* | 8/2016 | Gupta | G06F 21/566 |

OTHER PUBLICATIONS

Extended European Search Report issued in European Application No. 16195342.7 dated Jan. 9, 2017.

Extended European Search Report issued in European Application No. 16195333.6 dated Jan. 24, 2017.

Golde, "SMS Vulnerability Analysis on Feature Phones," Diploma Thesis; Jan. 17, 2011; 81 pages; <http://www.isti.tu-berlin.de/fileadmin/fg214/finished_theses/NicoGolde/diplom_golde/pdf>.

Scarfone et al., "Technical Guide to Information Security Testing and Assessment," Recommendations of the National Institute of Standards and Technology, Special Publication 800-115; Sep. 30, 2008; 80 pages; <http://nvlpubs.nist.gov/nistpubs/Legacy/SP/nistspecialpublication800-115.pdf>.

Office Action issued in related U.S. Appl. No. 14/922,752 dated Aug. 2, 2017.

* cited by examiner

200

| b8 | b7 | b6 | b5 | b4 | b3 | b2 | b1 | |
|----|----|----|----|----|----|----|----|---|
| | | | | | | | | 00: NO PoR REPLY TO THE SENDING ENTITY (SE) |
| | | | | | | | | 01: PoR REQUIRED TO BE SENT TO THE SE |
| | | | | | | | | 10: PoR REQUIRED ONLY WHEN AN ERROR HAS OCCURRED |
| | | | | | | | | 11. RESERVED |
| | | | | | | | | 00: NO SECURITY APPLIED TO PoR RESPONSE TO SE |
| | | | | | | | | 01: PoR RESPONSE WITH SIMPLE RC APPLIED TO IT |
| | | | | | | | | 10: PoR RESPONSE WITH CC APPLIED TO IT |
| | | | | | | | | 11: PoR RESPONSE WITH DS APPLIED TO IT |
| | | | | | | | | 0: PoR RESPONSE SHALL NOT BE CIPHERED |
| | | | | | | | | 1: PoR RESPONSE SHALL BE CIPHERED |
| | | | | | | | | FOR SMS ONLY |
| | | | | | | | | 0: PoR RESPONSE SHALL BE SENT USING SMS-DELIVER-REPORT |
| | | | | | | | | 1: PoR RESPONSE SHALL BE SENT USING SMS-SUBMIT |
| | | | | | | | | RESERVED (SET TO ZERO AND IGNORED BY RE) |

FIG. 2

PREVENTING MESSAGING ATTACKS

BACKGROUND

The present disclosure relates to preventing messaging attacks. In some cases, short messages, e.g., Short Message Service (SMS) messages, can be communicated in a communication network. A communication device may receive a short message and send a response short message. In some cases, these short messages can be formatted according to a standardized communications protocol, e.g., the SMS protocol.

DESCRIPTION OF DRAWINGS

FIG. 2 shows an example structure of the second Security Parameter Indicator (SPI) octet.

Like reference numbers and designations in the various drawings indicate like elements.

DETAILED DESCRIPTION

Figure 1:
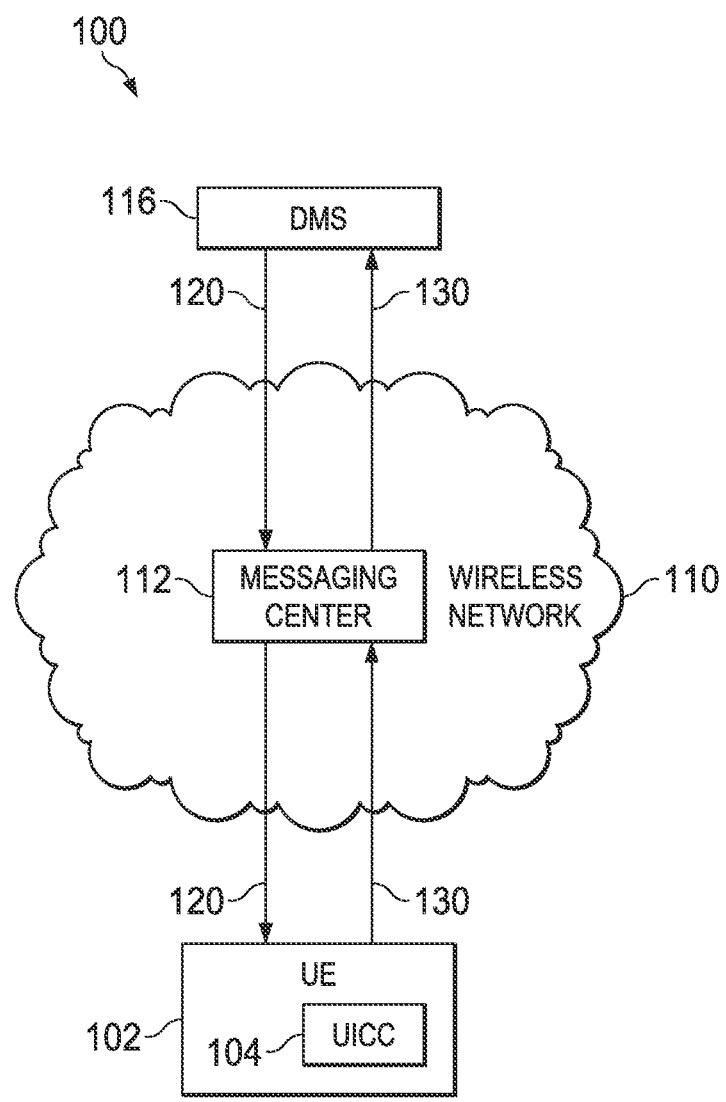
FIG. 1 is a schematic diagram showing an example communication system that prevents messaging attacks.

In some cases, a user equipment (UE) can include a Universal Integrated Circuit Card (UICC). For example, a UE can include a mobile equipment (ME) and a UICC. The ME can be configured to perform radio transmission functions and execute applications. The UICC can be used in identifying the UE to a service provider. The UICC can also provide a basis for security between the UE and the service provider's network. In some cases, the UICC can store the international mobile subscriber identity (IMSI) and the related key used to identify and authenticate subscribers on a mobile device. The UICC can be implemented in hardware circuits, software, or a combination thereof.

In some cases, a message, e.g., an SMS message, can be received at the UE. The message can be addressed to the UICC. For example, a (U)SIM Toolkit message may be used by a service provider to install an application on the UICC or provide a software update to the UICC. A (U)SIM Toolkit message is an SMS message that is addressed to the UICC. (U)SIM Toolkit messages include a set of command packets that can define how a UICC would interact directly with the entities outside of the UE and initiate commands independently of the UE or the network. In some cases, because the (U)SIM Toolkit message is addressed to the UICC, a UE may forward the (U)SIM Toolkit message directly to the UICC, without displaying it to the user of the UE or otherwise alerting the user. Table 1 shows an example command packet structure.

TABLE 1 example command packet structure

| Element | Length | Ciphering | Comment |
|---|---|---|---|
| Command Packet Identifier (CPI) | 1 octet | | Identifies that this data block is the secured Command Packet. |
| Command Packet Length (CPL) | Variable | | This indicates the number of octets from and including the Command Header Identifier to the end of the Secured Data, including any padding octets required for ciphering. |
| Command Header Identifier (CHI) | 1 Octet | | Identifies the Command Header. |
| Command Header Length (CHL) | Variable | | This indicates the number of octets from and including the SPI to the end of the RC/CC/DS. |
| Security Parameter Indicator (SPI) | 2 Octets | | Defines the security level applied to the input and output message. |
| Ciphering Key Identifier (KIc) | 1 Octet | | Key and algorithm Identifier for ciphering. |
| Key Identifier (KID) | 1 Octet | | Key and algorithm Identifier for RC/CC/DS. |
| Toolkit Application Reference (TAR) | 3 Octets | | Coding is application dependent as defined. |
| Counter (CNTR) | 5 Octets | Note 1 | Replay detection and Sequence Integrity counter. |
| Padding Counter (PCNTR) | 1 Octet | Note 1 | This indicates the number of padding octets used for ciphering at the end of the secured data. |
| Redundancy Check (RC), Cryptographic Checksum (CC) or Digital Signature (DS) | Variable | Note 1 | Length depends on the algorithm. A typical value is 8 octets if used, and for a DS could be 48 or more octets; the minimum should be 4 octets. |
| Secured data | Variable | Note 1 | Contains the Secured Application Message and possibly padding octets used for ciphering. |

Note 1:
These fields are ciphered if ciphering is indicated in the Security Header As shown in Table 1, the command packet includes the Security Parameter Indicator (SPI) field. The SPI field provides information on the security used in the incoming Command Header and any reply sent by the UICC. The SPI includes two octets. The first SPI octet includes information on the integrity approach used, e.g., a redundancy check (RC), checksum (CC), or digital signature (DS). If the SPI indicates that no RC, CC, or DS is present in the Command Header, then the RC/CC/DS field is of zero length. The first SPI octet also indicates the presence of ciphering mode and counter behavior.

The second SPI octet provides information on proof of receipt (PoR). PoR is an automatically generated reply. In some cases, the PoR may be generated as a result of attacks. FIG. 2 shows an example structure of the second SPI octet 200. As shown in FIG. 2, the second SPI octet 200 includes b2b1 bits, which may be set to "00"—indicating that no PoR is required, "01"—indicating that a PoR is required to be sent to the sending entity (SE), "10"—indicating that a PoR is required when an error has occurred, or "11"—reserved. The second SPI octet 200 also includes b4b3 bits, which indicate the types of security applied to the PoR response. The second SPI octet 200 includes b5 bit, which indicate whether the PoR response is ciphered. The second SPI octet 200 also includes b6 bits, which indicate whether SMS-DELIVER-REPORT or SMS-SUMBIT should be used to send the PoR response.

Figure 3:
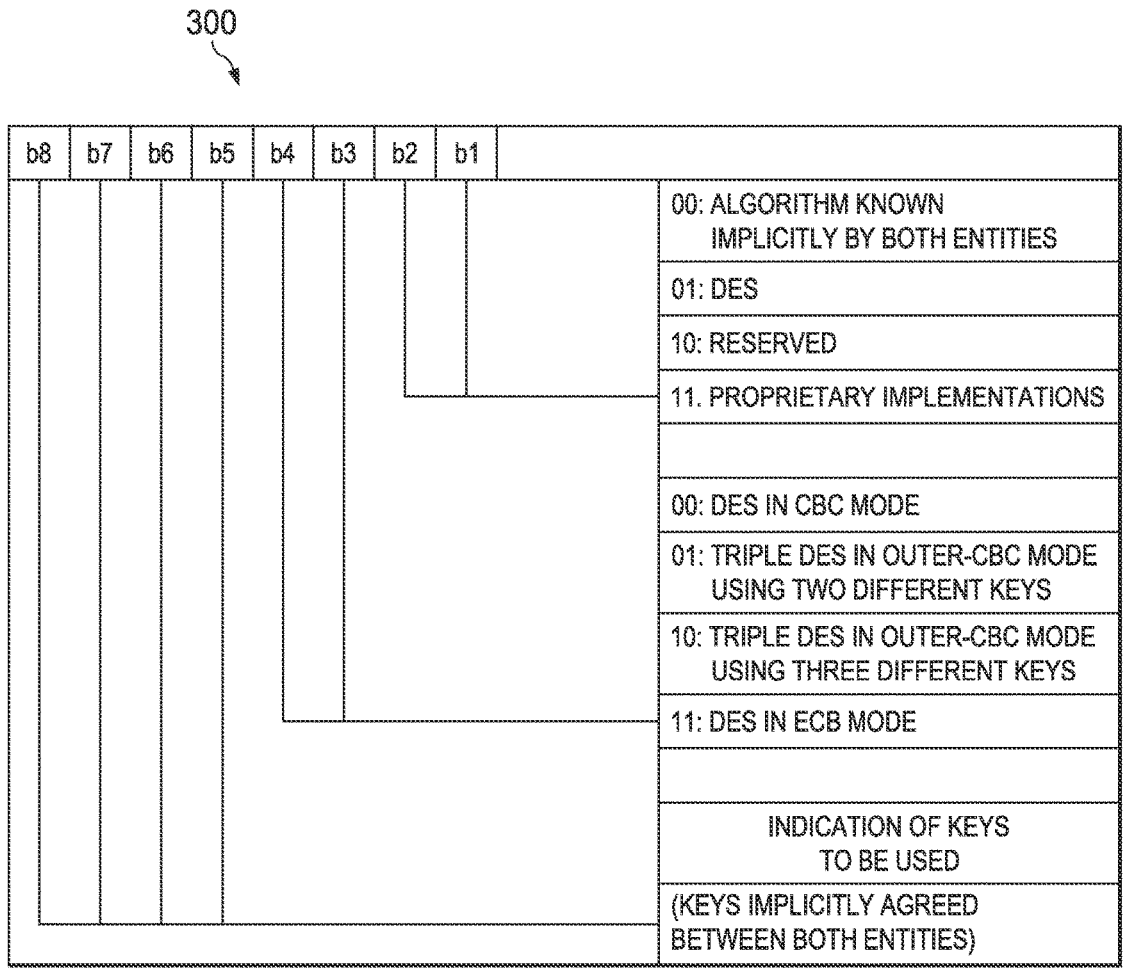
FIG. 3 shows an example structure of a Key Identifier.

The command structure of the (U)SIM Toolkit message also includes the Key Identifier (KID) field. The KID field indicates the ciphering algorithms used in computing the cryptographic checksum when b2b1 is set to "10" in the first octet of the SPI. FIG. 3 shows an example structure of a KID 300. As shown in FIG. 3, the KID 300 includes b2b1 bits, which may be set to "01" to indicate a (Data Encryption Standard) DES-based algorithm. Examples of DES-based algorithm include single DES (also referred to as "DES") or triple DES (also referred to as "3DES"). Single DES was originally published in 1977 and is considered a very weak algorithm due to its short 56-bit key. As a result, it was withdrawn as a cryptographic standard by NIST in 2005 and deprecated from UICC in 2008. However, some legacy UICC may still support single DES. The KID 300 includes b4b3 bits, which may be set to "00"—indicating single DES in Cipher Block Chaining (CBC) mode, "01" or "10"—indicating 3DES, or "11"—indicating single DES in Electronic Codebook (ECB) mode.

In some cases, the UICC may be subject to messaging attacks. In a messaging attack to the UICC, the UICC may receive a malicious message and automatically send a response even when authentication of the message fails. In some cases, the malicious message may be a command packet targeting the (U)SIM Toolkit. UICCs that follow the 2012 or later standards may not provide any response unless the incoming command packet is successfully authenticated. On the other hand, UICCs that follow the prior standards may provide a response, and therefore, may be subject to attacks.

Examples of messaging attacks include the premium rate attack. In a premium rate attack, the attacker triggers the UICC to send a message to a premium rate number, and therefore receive financial benefits associated with the premium rate number. In one example, the attacker sends a malicious (U)SIM Toolkit message addressed to a UICC. The malicious message may trigger a response addressed to a premium rate number. For example, the attacker may set bits b2b1 in the second SPI octet to "01" to request a PoR. The attacker may also set the bit b6 in the second SPI octet to "1" to request the PoR be sent by an SMS SUBMIT message to the sending entity (SE) instead of the operators Short Message Service Center (SMSC). The attacker may further set the sending entity (SE) address in the (U)SIM Toolkit message to the premium service. The user of the UE that is associated with the UICC is then charged for use of the premium service without the user's knowledge, consent, or input. Because the attacker may not know the UICC keys, authentication of this message may fail. However, as discussed previously, UICCs that follow the pre-2012 standards may provide a response nevertheless, and therefore, are subject to the attack.

Examples of messaging attacks also include the key compromise attack. In a key compromise attack, an attacker obtains an over the air (OTA) key by making the UICC send a response message with a weak cryptographic protection. The attacker determines the key through crypto-analysis over the response message. With the encryption key, the attacker may decrypt voice/data traffic at the radio layer and install malicious application in the UICC.

In an example, an attacker sends a malicious (U)SIM Toolkit over the air (OTA) message to a UICC. The message requests an automatic response with single DES checksum. Though the incoming malicious message is incorrectly signed (since the attacker does not yet know the real OTA key), the UICC may automatically reply with a correctly signed response as requested. The attacker can then perform crypto-analysis, e.g., using a rainbow table, on the signed response to obtain the real OTA key. Once the key is obtained, the attacker may download a malicious application on the UICC. The malicious application may use pre-defined functions available in the phone, e.g., change voicemail numbers, query the phone location, silently send SMS messages, copy contact list, and obtain the UICC master secret. The UICC master secret provides the basis of security between a service provider and a user. If UICC master secret is compromised, any security provided by the service provider may be at risk for both voice and data transmissions.

In some cases, the messaging attacks may be prevented by requesting user permission whenever a message is received. For example, if a message is received at the UE, a user interface at the UE may display the message, and request the user to authorize the delivery of the message. However, this approach may be inefficient because it does not distinguish between messages that are addressed to the UICC or messages that are addressed to a user of the UE or software applications on the UE, and therefore, may display messages that are unrelated to attacks on the UICC. Furthermore, a user usually does not have the technical expertise to determine whether a message, in particular a message that is specifically configured for the UICC, is malicious. Therefore, the user may either allow all the messages to go through, which renders the UICC at risk to attacks, or instruct to drop all the messages, which may block a service provider's attempt to program the UICC using a (U)SIM Toolkit message.

FIG. 1 is a schematic diagram showing an example communication system 100 that prevents messaging attacks. The example communication system 100 includes a wireless communication network 110 that is communicatively coupled with a UE 102 and a device management system (DMS) 116. The wireless communication network 110 also includes a messaging center 112.

The DMS 116 represents an application, set of applications, software, software modules, hardware, or combination thereof that can be used to manage devices. In some cases, a service provider can configure the DMS 116 to determine whether a UICC associated with a UE is at risk to messaging attacks. For example, the DMS 116 can send a scanning message 120 to the UE 102 via the wireless communication network 110. The DMS 116 can receive a response message 130 from the UE 102 via the wireless communication network 110. The DMS 116 can analyze the response message to determine whether the UICC associated with the UE is at risk to messaging attacks. In some cases, the DMS 116 can also receive notifications that indicates the UE is at risk. In some cases, the DMS 116 can send firewall applications to the UE to prevent messaging attacks. FIGS. 4-11 and associated descriptions provide additional details to these implementations.

The wireless communication network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for the UE 102 to communicate. The base station may be distributed throughout the cellular network to provide a wide area of coverage. The base station directly communicates to one or a plurality of UEs, other base stations, and one or more core network nodes. The base station may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

As shown in FIG. 1, the wireless communication network 110 includes the messaging center 112. The messaging center 112 is a network node that can be configured to store, forward, convert, and deliver messages to and from the UE 102. In some cases, the messaging center 112 may be a short message service center (SMSC). In some cases, the messaging center 112 can route the scanning message sent by the DMS 116 to the UE 102, and route the response message sent by the UE 102 to the DMS 116. In some cases, a service provider may implement the DMS 116 and the messaging center 112 in the same hardware platform.

The example communication system 100 includes the UE 102. The UE 102 includes a UICC 104. In some cases, the UE 102 can send a scanning message to the UICC 104. The UE 102 can determine whether the UICC 104 is at risk to attacks based on the response message from the UICC 104. In some cases, the UE 102 can send a notification to the DMS 116 to indicate that the UICC 104 is at risk to attacks. In some cases, the UE 102 can install a firewall application to prevent attacks to the UICC 104. FIGS. 4-11 and associated descriptions provide additional details to these implementations.

Turning to a general description, a UE, e.g., the UE 102, may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 12:
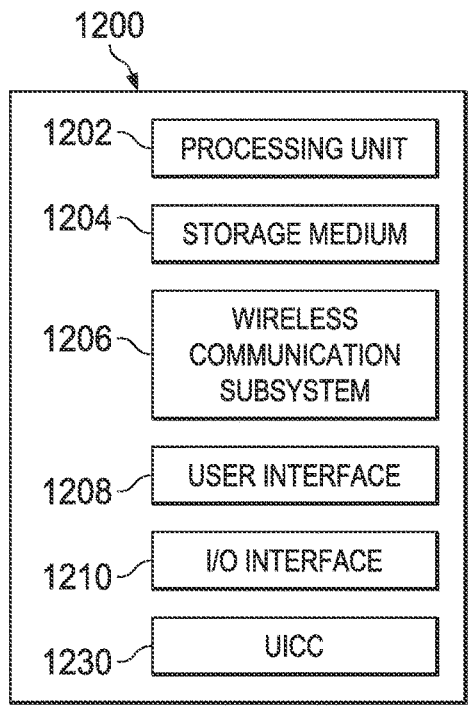
FIG. 12 is a block diagram illustrating an example user equipment (UE) device.

FIG. 12 is a block diagram illustrating an example user equipment (UE) device 1200. The illustrated device 1200 includes a processing unit 1202, a computer-readable storage medium 1204 (for example, ROM or flash memory), a wireless communication subsystem 1206, a user interface 1208, an I/O interface 1210, and a UICC 1230.

The processing unit 1202 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 1202 may be configured to generate control information, such as a measurement report, or respond to received information, such as control information from a network node. The processing unit 1202 may also be configured to make a Radio Resource Management (RRM) decision such as cell selection/reselection information or trigger a measurement report. The processing unit 1202 can also include other auxiliary components, such as random access memory (RAM) and read-only memory (ROM). The computer-readable storage medium 1204 can store an operating system (OS) of the device 1200 and various other computer-executable instructions, logic or software programs for performing one or more of the processes, steps, or actions described above.

The wireless communication subsystem 1206 may be configured to provide wireless communication for voice, data, and/or control information provided by the processing unit 1202. The wireless communication subsystem 1206 can include, for example, one or more antennas, a receiver, a transmitter, a local oscillator, a mixer, and a digital signal processing (DSP) unit. In some implementations, the subsystem 1206 can support multiple-input multiple-output (MIMO) transmissions. In some implementations, the receiver in the wireless communication subsystems 1206 can be an advance receiver or a baseline receiver. Two receivers can be implemented with identical, similar, or different receiver processing algorithms.

The user interface 1208 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1210 can include, for example, a universal serial bus (USB) interface.

The UICC 1230 represents an application, set of applications, software, software modules, hardware, or combination thereof that can be configured to identify the device 1200. The UICC 1230 may include a Subscriber Identity Module (SIM) application, a Universal Subscriber Identity Module (USIM) application, or a Removable User Identity Module (R-UIM) application. Various other components can also be included in the device 1200.

Figure 4:
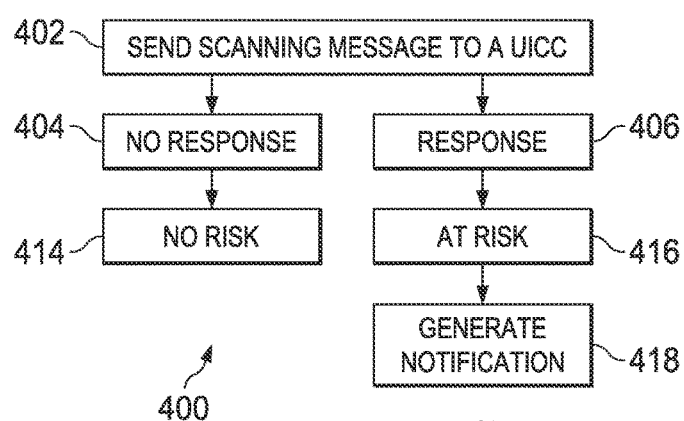
FIG. 4 is a flowchart showing an example process for determining that a Universal Integrated Circuit Card (UICC) is at risk to a premium rate attack.

FIG. 4 is a flowchart showing an example process 400 for determining that a UICC is at risk to a premium rate attack. The process 400 can be implemented by a user device in a communication system. For example, the process 400 can be implemented by the UE 102 shown in FIG. 1. The process 400 can also be implemented by another type of system or module, e.g., the DMS 116 shown in FIG. 1. The example process 400 shown in FIG. 4 can also be implemented using additional, fewer, or different operations, which can be performed in the order shown or in a different order.

Figure 5:
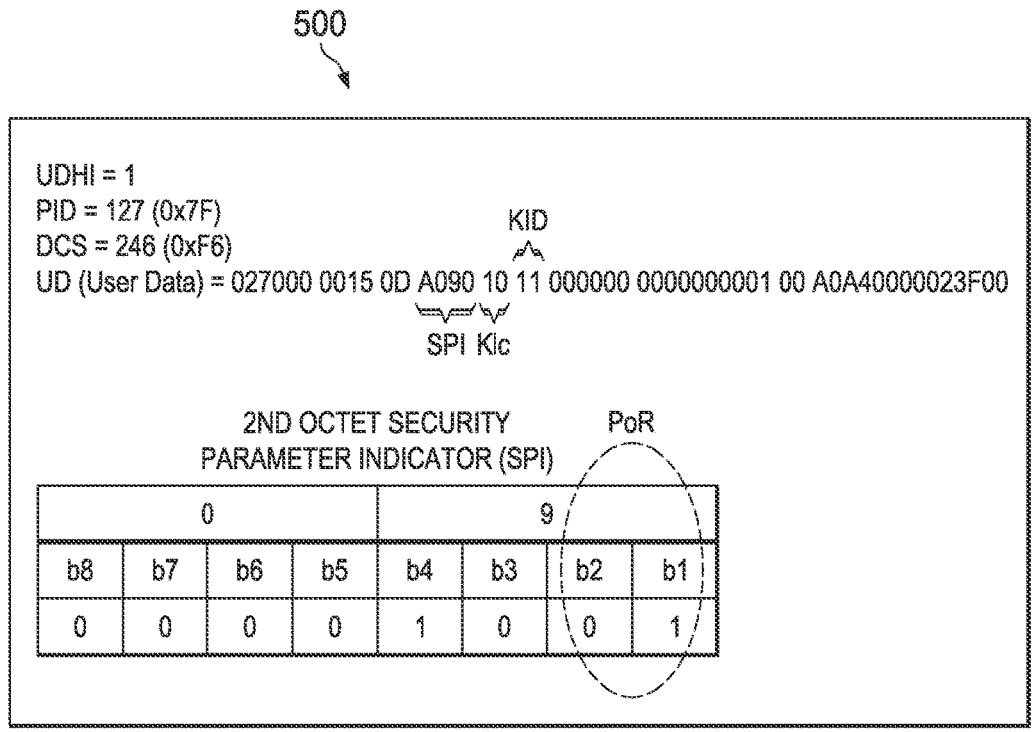
FIG. 5 shows a binary representation of an example scanning message.

The example process 400 begins at 402, where a scanning message is sent to a UICC. In some cases, the scanning message can be a (U)SIM Toolkit message. In some cases, the scanning message can be sent from a UE associated with the UICC. Alternatively or in combination, the scanning message can be sent from a DMS. FIG. 5 shows a binary representation of an example scanning message 500. The example scanning message 500 includes an SPI. The second octet of the SPI includes a PoR field, e.g., bits b2b1, that indicates whether a PoR reply should be sent. As shown in FIG. 5, bits b2b1 are set to "01," which indicate that a PoR reply should be sent. Alternatively, the bits b2b1 can also be set to "10," which indicate that a PoR reply should be sent when an error has occurred.

If a PoR reply is not received, the example process 400 proceeds to 404. In some cases, the entity that sends the scanning message, e.g., the UE or the DMS, can determine that a PoR reply is not received. In some cases, the sending entity can set a timer, and determines that a PoR reply is not received when the timer runs out and no PoR reply corresponding to the scanning message is received. From 404, the example process 400 proceeds to 414. At 414, the sending entity, e.g., the UE or the DMS, determines that the UICC is not at risk to the premium rate attack, e.g., the UICC is manufactured according to a rel-12 or later standard.

If a PoR reply is received, the example process 400 proceeds to 406. In some cases, the PoR reply may be received by the entity that sends the scanning message, e.g., the UE or the DMS. From 406, the example process 400 proceeds to 416. At 416, the sending entity, e.g., the UE or the DMS, determines that the UICC is at risk to the premium rate attack. From 416, the example process 400 proceeds to 418, where a notification is generated. The notification can indicate that the UICC is at risk to attacks. In some cases, the notification can indicate the type of attack that the UICC is at risk to, e.g., the UICC is at risk to the premium rate attack. In some cases, e.g., when the determination that the UICC is at risk to attacks is made at the DMS, the notification can be sent to the UE. In some cases, the notification can be displayed on the UE. In some cases, the notification can instruct a user of the UE to replace the UICC. In some cases, the user can contact a service provider, e.g., by pushing a button, to inform the service provider that the UICC is found to be at risk to attacks.

Figure 6:
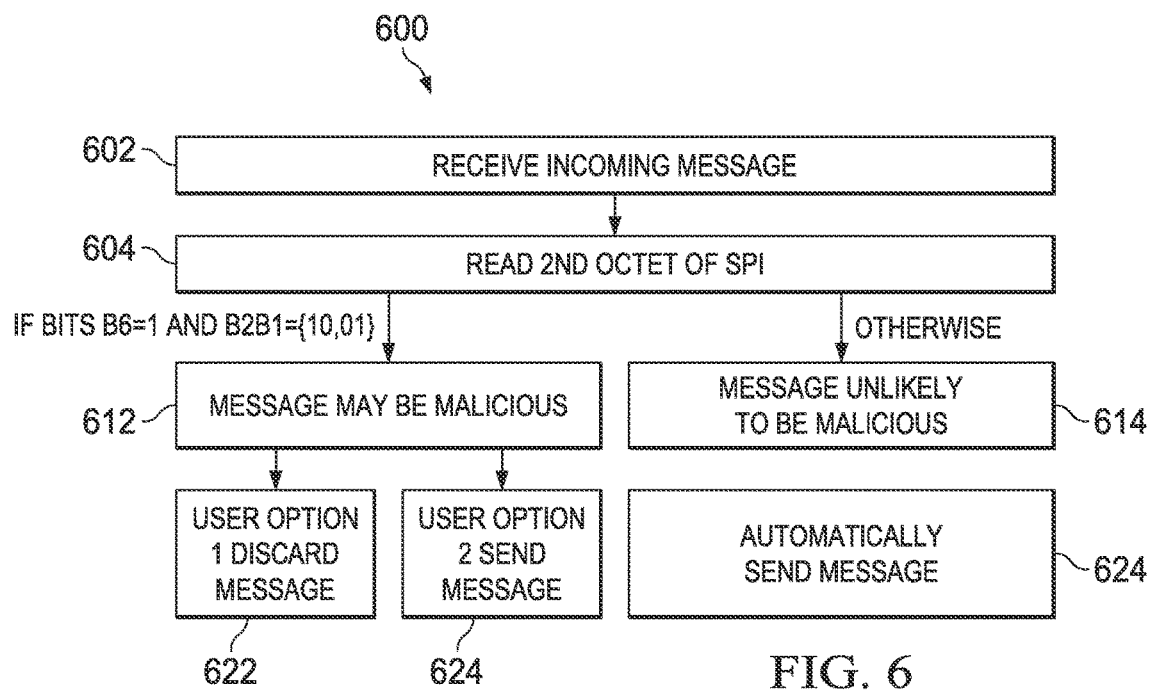
FIG. 6 is a flowchart showing an example process for a firewall that determines whether an incoming message may cause a premium rate attack.

In some cases, a firewall application can be installed on the UE that is associated with the UICC at risk to a premium rate attack. In some cases, a UE can install the firewall application in response to determining that the UICC is at risk to a premium rate attack. In some cases, the DMS may send the firewall application to the UE. In some cases, the firewall application can process an incoming message addressed to the UICC and determine whether the message may be malicious. FIG. 6 is a flowchart showing an example process 600 for a firewall that determines whether an incoming message may cause a premium rate attack. The example process 600 shown in FIG. 6 can also be implemented using additional, fewer, or different operations, which can be performed in the order shown or in a different order.

The example process 600 begins at 602, where an incoming message addressed to the UICC is received at the UE. At 604, the firewall application processes the incoming message and determines the second octet of the SPI field in the incoming message. If the b2b1 bits are set to "10" or "01," and the b6 bit is set to "1," the example process 600 proceeds from 604 to 612. These settings indicate that a PoR reply is requested to be delivered through SMS-SUBMIT. Therefore, the message may be malicious for a premium rate attack. In some implementations, the firewall application can generate an alert. The firewall application can display the alert on the UE. The alert can indicate to the user that an incoming message that may be malicious is received. In some cases, the firewall application can request that the user determine how to proceed. If the user selects to discard the message, the process 600 proceeds from 612 to 622, where the incoming message is discarded, without being sent to the UICC. If the user selects to continue with the message, the process 600 proceeds from 612 to 624, where the message is forwarded to the UICC.

If, on the other hand, the b2b1 bits are not set to either "10" or "01," or the b6 bit is set to "0," then the process 600 proceeds from 604 to 614. At 614, the firewall application determines that the message is unlikely to be malicious for a premium rate attack. The process continues from 614 to 624, where the message is automatically forwarded to the UICC.

Figure 7:
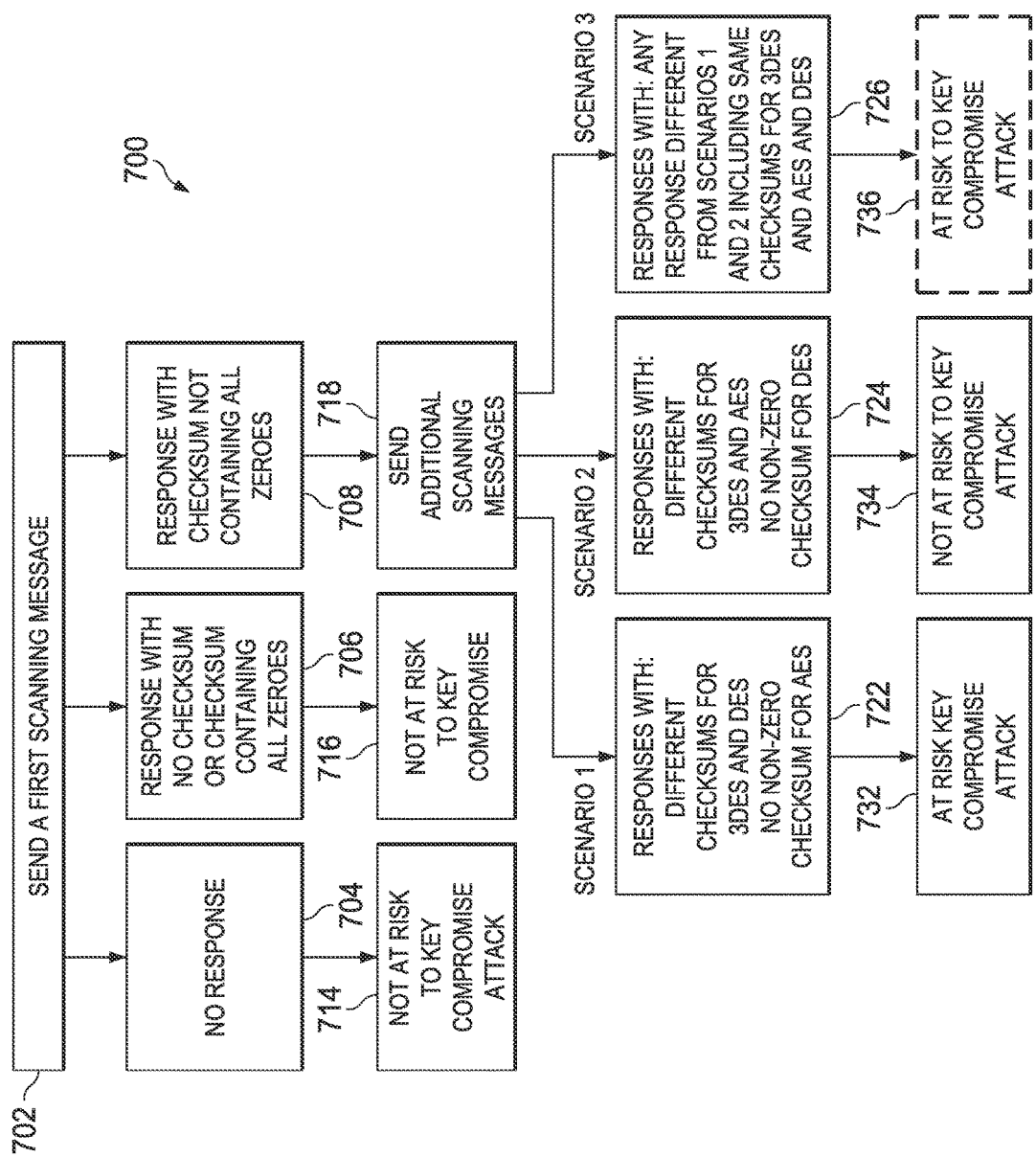
FIG. 7 is a flowchart showing an example process for determining that a UICC is at risk to a key compromise attack.

FIG. 7 is a flowchart showing an example process 700 for determining that a UICC is at risk to a key compromise attack. The process 700 can be implemented by a user device in a communication system. For example, the process 700 can be implemented by the UE 102 shown in FIG. 1. The process 700 can also be implemented by another type of system or module, e.g., the DMS 116 shown in FIG. 1. The example process 700 shown in FIG. 7 can also be implemented using additional, fewer, or different operations, which can be performed in the order shown or in a different order.

Figure 8:
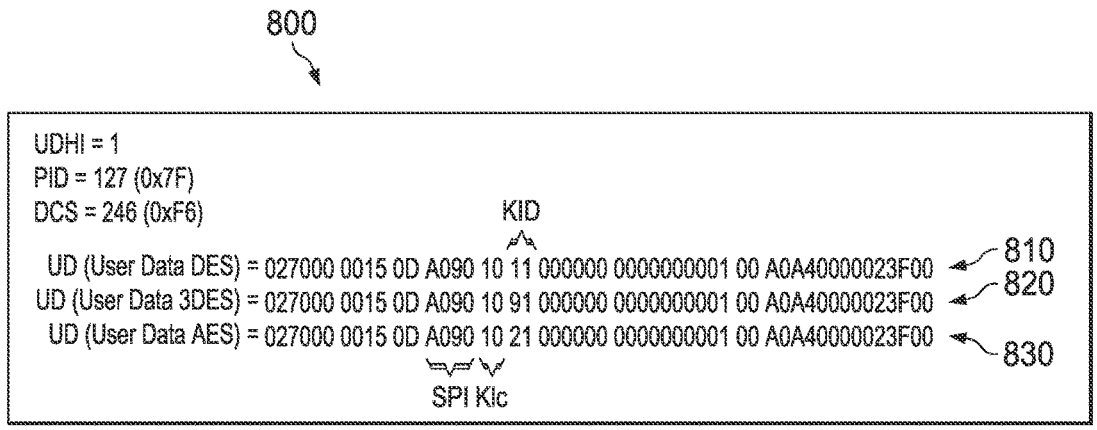
FIG. 8 is a schematic diagram that illustrates example scanning messages.

The example process 700 begins at 702, where a first scanning message is sent to a UICC. In some cases, the scanning message can be a (U)SIM Toolkit message. In some cases, the first scanning message can be sent from a UE associated with the UICC. Alternatively or in combination, the first scanning message can be sent from a DMS. The first scanning message can request a checksum according to one encryption algorithm. For example, bits b4b3 in the second octet in the SPI can be set to request a PoR reply with a checksum, while bits b4b3b2b1 in the KID field can be set to request a particular encryption algorithm. In some cases, because 3DES is supported in all standard releases, the KID field for the first scanning message is set to request 3DES. FIG. 8 and associated descriptions provide additional details.

If a response is not received, the example process 700 proceeds to 704. In some cases, the entity that sends the first scanning message can set a timer, and determines that a response is not received when the timer runs out before a response corresponding to the first scanning message is received. From 704, the example process 700 proceeds to 714. At 714, the sending entity, e.g., the UE or the DMS, determines that the UICC is not at risk to the key compromise attack.

If a response is received, and no checksum is included in the response or checksum in the response is set to all zeros, the example process 700 proceeds to 706. From 706, the example process 700 proceeds to 716. At 716, the sending entity, e.g., the UE or the DMS, determines that the UICC is not at risk to the key compromise attack.

If a response is received, and at least one bit in the checksum is not set to "0," the example process 700 proceeds to 708. In some cases, additional scanning messages can be sent to determine whether a weak encryption algorithm is used. From 708, the example process 700 proceeds to 718, where additional scanning messages are sent. In some cases, a UICC may support single DES, 3DES, AES, or any combination thereof. In some cases, to determine whether the UICC supports single DES, which is the weak algorithm, three scanning messages can be used. For example, the first scanning message sent at 702 can request 3DES, while two additional scanning messages can be sent at 718 that request single DES and AES, respectively.

FIG. 8 is a schematic diagram 800 that illustrates example scanning messages. The schematic diagram 800 includes the binary representations of the scanning message 810 for single DES, the scanning message 820 for 3DES, and the scanning message 830 for AES. As shown in FIG. 8, the KID field of the scanning message can be set according to the requested encryption algorithm. The KID field of the message 810 is set to "11," indicating that the requested encryption algorithm is single DES. The KID field of the message 820 is set to "91," indicating that the requested encryption algorithm is 3DES. The KID field of the message 830 is set to "21," indicating that the requested encryption algorithm is AES.

Referring back to FIG. 7, the sending entity, e.g., the UE or the DMS, can determine whether the UICC supports single DES by comparing the checksum in the response messages to the first, the second, and the third scanning message. If the response messages to the scanning messages for 3DES and single DES include different checksums but the response message to the scanning message for AES does not include non-zero checksum, the process 700 proceeds from 718 to 722. At 722, the sending entity determines that the UICC supports 3DES and single DES, but not AES. From 722, the process 700 proceeds to 732, where the UE or the DMS determines that the UICC is at risk to a key compromise attack.

If the response messages to the 3DES and AES scanning messages include different checksums but the response message to the scanning message for single DES does not include non-zero checksum, the process 700 proceeds from 718 to 724. At 724, the sending entity determines that the UICC supports 3DES and AES, but not single DES. From 724, the process 700 proceeds to 734, where the UE or the DMS determines that the UICC is not at risk to a key compromise attack.

For other scenarios different than 722 or 724, e.g., the response messages include the same checksum for the three scanning messages, the example process 700 proceeds to 726. In some cases, a UICC may be hardcoded to use one encryption algorithm regardless of which algorithm is requested. Therefore, the checksums for the response messages may be the same for all three scanning messages. In these or other cases, the UICC may be hardcoded to use single DES, which makes the UICC at risk to the key compromise attack. The UICC may also be hardcoded to use 3DES or AES, which makes the UICC not at risk to the compromise attack. In some cases, the process 700 proceeds from 726 to 736, where the UE or the DMS takes a cautious approach and determines that the UICC is at risk to a key compromise attack. Alternatively or in combination, the UE or the DMS may take additional steps to determine whether the UICC is hardcoded to use single DES, 3DES, or AES.

In some cases, as described previously relating to the premium rate attack, a notification can be generated in response to determining that the UICC is at risk to a key compromise attack. In some cases, e.g., when the determination that the UICC is at risk to attacks is made at the DMS, the notification can be sent to the UE. In some cases, the notification can be displayed on the UE. In some cases, the notification can instruct a user of the UE to replace the UICC. In some cases, the user can contact a service provider, e.g., by pushing a button, to inform the service provider that the UICC is found to be at risk to attacks.

Figure 9:
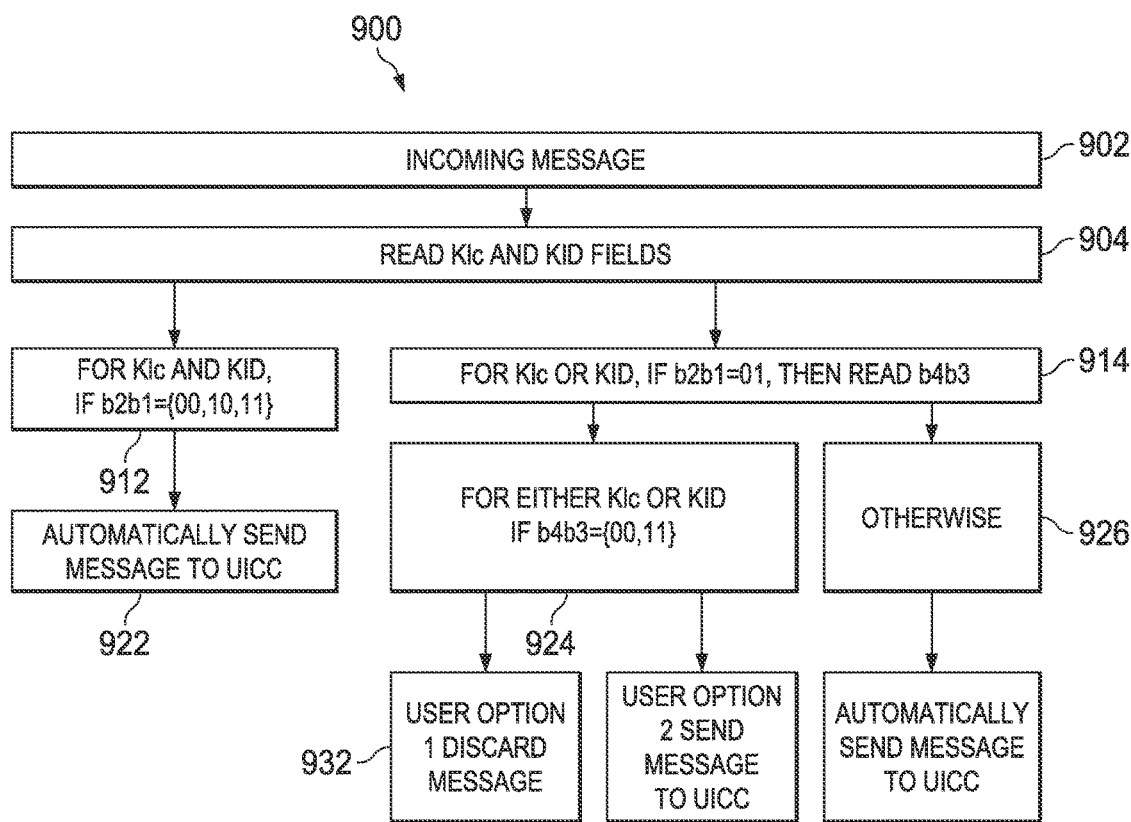
FIG. 9 is a flowchart showing an example process for a firewall that determines whether an incoming message may cause a key compromise attack.

In some cases, as described previously relating to the premium rate attack, a firewall application can be installed on the UE that is associated with the UICC at risk to a key compromise attack. In some cases, a UE can install the firewall application in response to determining that the UICC at risk to a key compromise attack. In some cases, the DMS may send the firewall application to the UE. In some cases, the firewall application can process an incoming message addressed to the UICC and determine whether the message may be malicious. FIG. 9 is a flowchart showing an example process 900 for a firewall that determines whether an incoming message may cause a key compromise attack. The example process 900 shown in FIG. 9 can also be implemented using additional, fewer, or different operations, which can be performed in the order shown or in a different order.

The example process 900 begins at 902, where an incoming message addressed to the UICC is received at the UE. At 904, the firewall application processes the incoming message and determines the KLc and the KID fields in the incoming message. If the b2b1 bits in both the KLc and the KID fields are set to one of "00," "10," or "11," the example process 900 proceeds from 904 to 912, where the firewall application determines that single DES is not requested and the message is unlikely to be malicious for a key compromise attack. From 912, the example process 900 proceeds to 922, where the message is automatically forwarded to the UICC.

If the b2b1 bits in either the KLc or the KID fields are set to "01," the example process 900 proceeds from 904 to 914, where the firewall application determines that a DES-based algorithm, e.g., single DES or 3DES, may be requested. The firewall application continues to determine whether the b4b3 bits in either the KLc or the KID fields indicate that DES, instead of 3DES, is requested. If b4b3 bits are set to "00," or "11," the example process 900 proceeds from 914 to 924. At 924, the firewall application determines that the message may be malicious for a key compromise attack.

In some implementations, as described previously relating to the premium rate attack, the firewall application can generate an alert. The firewall application can display the alert on the UE. The alert can indicate to the user that an incoming message that may be malicious is received. In some cases, the firewall application can request that the user determine how to proceed. If the user selects to discard the message, the process 900 proceeds from 924 to 932, where the incoming message is discarded, without being sent to the UICC. If the user selects to continue with the message, the process 900 proceeds from 924 to 934, where the message is forwarded to the UICC.

If the b4b3 bits in both the KLc and the KID fields are set to "10," or "01," the example process 900 proceeds from 914 to 926. At 926, the firewall application determines that single DES is not requested and the message is unlikely to be malicious for a key compromise attack. From 926, the example process 900 proceeds to 936, where the message is automatically forwarded to the UICC.

In some cases, the firewall application can also examine the Sending Entity (SE) address of the incoming message. Since a (U)SIM Toolkit message is used by an operator, an operator can provide a whitelist of valid Sending Entity addresses. Therefore, if the SE address of the incoming message matches at least one address in the whitelist, then the firewall application can forward the message to the UICC, without checking the message for either the premium attack, e.g., as described in FIG. 6, or the key compromise attack, e.g., as described in FIG. 9.

In some cases, the firewall application can count the incoming messages from an SE address that does not match any address in the whitelist. In some cases, if the count exceeds a predetermined threshold, the firewall application can generate an alert. The firewall application can display the alert on the UE, send the alert to the DMS or any other entities in the operator's network, or a combination thereof. In some cases, the firewall application can count the discarded messages based on the screening for either the premium attack or the key compromise attack described above. The firewall application may send an alarm to the user, the operator, or a combination thereof if the discarded messages exceed a predetermined threshold.

In some cases, the firewall application can also identify the types of the incoming message and determine whether the incoming message may be a potential malicious message based on the type of the message. For example, potential malicious messages can include a message that is configured to install an application or the UICC, e.g., a message having the type "USIM_DATA_DOWNLOAD." Potential malicious messages can also include a message that instructs the recipient to transmit a receipt while discarding the contents of the message, e.g., a message having the type "Type 0 SMS." Therefore, if the firewall application determines that the type of the incoming message matches one of the types that correspond to a potential malicious message, the firewall application can generate an alert, display the alert on the UE, send the alert to the DMS or any other entities in the operator's network, or a combination thereof.

Figure 10:
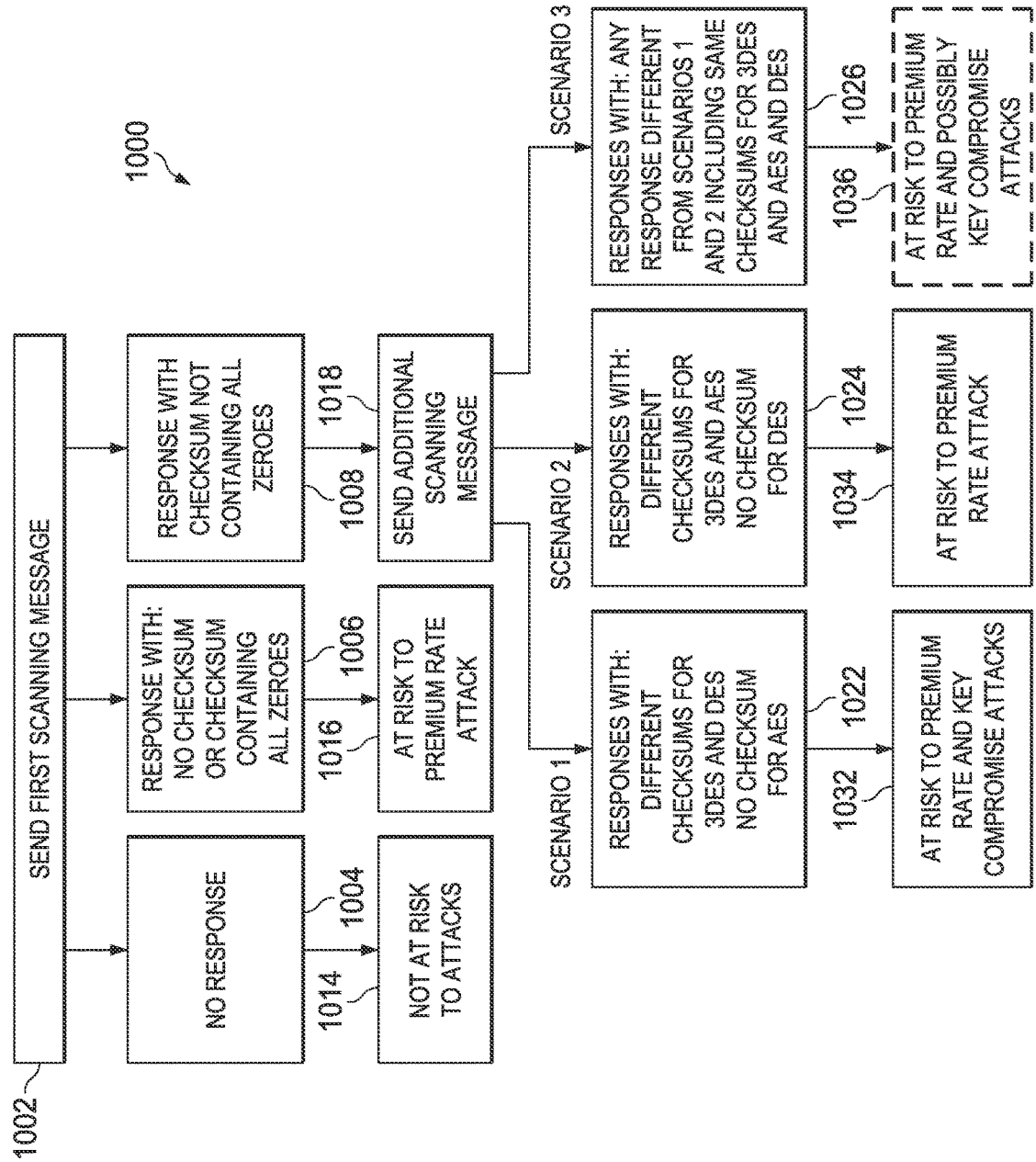
FIG. 10 is a flowchart showing an example process for determining that a UICC is at risk to either a premium rate attack or a key compromise attack.

In some cases, a combined process can be used to scan for the premium rate attack and the key compromise attack described previously. FIG. 10 is a flowchart showing an example process 1000 for determining that a UICC is at risk to either a premium rate attack or a key compromise attack. The process 1000 can be implemented by a user device in a communication system, e.g., the UE 102 or the DMS 116 shown in FIG. 1. The example process 1000 shown in FIG. 10 can also be implemented using additional, fewer, or different operations, which can be performed in the order shown or in a different order.

The example process begins at 1002, where a first scanning message is sent to a UICC. In some cases, the scanning message can be a (U)SIM Toolkit message. In some cases, the first scanning message can be sent from a UE associated with the UICC. Alternatively or in combination, the first scanning message can be sent from a DMS. In the first scanning message, the b2b1 bits in the second octet of SPI are set to "01" to indicate that a PoR reply is requested. The b4b3 bits in the second octet in the SPI are set to request a checksum. The KID field of the first scanning message is set to request 3DES.

If no response is received, the example process 1000 proceeds from 1002 to 1004. From 1004, the example process 1000 proceeds to 1014. At 1014, the sending entity, e.g., the UE or the DMS, determines that the UICC is not at risk to attacks.

If a response message is received, but the response message either does not include a checksum or the response message includes an all-zero checksum, the example process 1000 proceeds from 1002 to 1006. From 1006, the example process 1000 proceeds to 1016. At 1016, the sending entity, e.g., the UE or the DMS, determines that the UICC is at risk to the premium rate attack but not to the key compromise attack.

If a response message that includes non-zero checksum is received, the example process 1000 proceeds from 1002 to 1008. In some cases, additional scanning messages can be sent to determine whether a weak encryption algorithm is used. From 1008, the example process 1000 proceeds to 1018, where additional scanning messages are sent. As described previously, in some cases, two additional scanning messages can be sent that request single DES and AES, respectively.

If the response messages to the scanning messages for 3DES and single DES include different checksums but the response message to the scanning message for AES does not include non-zero checksum, the process 1000 proceeds from 1018 to 1022. At 1022, the sending entity determines that the UICC supports 3DES and single DES, but not AES. From 1022, the process 1000 proceeds to 1032, where the UE or the DMS determines that the UICC is at risk to both the premium rate attack and the key compromise attack.

If the response messages to the 3DES and AES scanning messages include different checksums but the response message to the scanning message for single DES does not include non-zero checksum, the process 1000 proceeds from 1018 to 1024. At 1024, the sending entity determines that the UICC supports 3DES and AES, but not single DES. From 1024, the process 1000 proceeds to 1034, where the UE or the DMS determines that the UICC is at risk to the premium rate attack but not at risk to the key compromise attack.

For other scenarios different than 1022 or 1024, e.g., the response messages include the same checksum for the three scanning messages, the example process 1000 proceeds to 1026. The UE or the DMS may determine that the UICC is hardcoded to respond with one encryption algorithm. The process 1000 proceeds from 1026 to 1036, where the UE or the DMS determines that the UICC is at risk to the premium rate attack and possibly at risk to the key compromise attack. In some cases, as described previously, the UE or the DMS may take a cautious approach and determine that the UICC is at risk to the key compromise attack. Alternatively or in combination, the UE or the DMS may take additional steps to determine whether the UICC is hardcoded to use single DES, and therefore is at risk to the key compromise attack.

In some cases, determining whether the UICC is at risk to attacks can be implemented on a UE by modem software on the UE. For example, during an initial device boot-up procedure or a UICC change procedure, the scanning message can be injected into UICC by modem software as if it is received from Over the Air (OTA). Response address can be hardcoded to an invalid address like "987654321" so that modem software can distinguish the response to the scanning message from responses to other messages. Modem software can determine whether the UE is at risk to attacks based on the response. Response packet to the scanning message may not be sent to the network. If the UICC is at risk, a dialog can be displayed to the user with warning messages.

Figure 11:
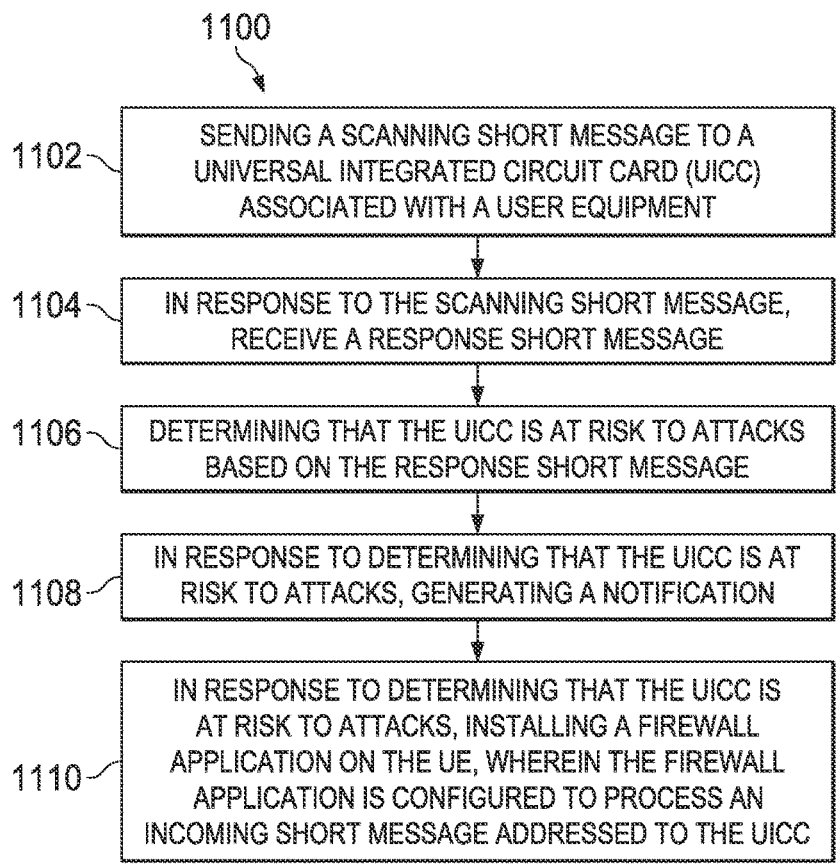
FIG. 11 is a flowchart showing an example process for preventing messaging attacks.

FIG. 11 is a flowchart showing an example process 1100 for preventing messaging attacks. The process 1100 can be implemented by a user device in a communication system. For example, the process 1100 can be implemented by the UE 102 shown in FIG. 1. The process 1100 can also be implemented by another type of system or module, e.g., the DMS 116 shown in FIG. 1. The example process 1100 shown in FIG. 11 can also be implemented using additional, fewer, or different operations, which can be performed in the order shown or in a different order.

The example process 1100 begins at 1102, where a scanning short message is sent to a UICC associated with a UE. At 1104, a response short message is received in response to the scanning short message. At 1106, the UICC is determined to be at risk to attacks based on the response short message. At 1108, in response to determining that the UICC is at risk to attacks, a notification is generated. In some cases, the notification is sent to a DMS. Alternatively or in combination, the notification is displayed on the UE. At 1110, in response to determining that the UICC is at risk to attacks, a firewall application is installed on the UE. The firewall application is configured to process an incoming short message addressed to the UICC.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
   sending a scanning short message to a Universal Integrated Circuit Card (UICC) associated with a mobile device;
   receiving a response short message in response to the scanning short message;
   determining that the UICC is at risk to attacks based on the response short message, wherein determining that the UICC is at risk to attacks comprises determining a type of attack that the mobile device is at risk to, and the type of attack is at least one of a premium rate attack or a key compromise attack; and
   in response to determining that the UICC is at risk to attacks, generating a notification, wherein generating the notification comprises at least one of sending the notification to a device management system or outputting the notification on the mobile device.

2. The method of claim 1, further comprising:
   in response to determining that the UICC is at risk to attacks, installing a firewall application on the mobile device, wherein the firewall application is configured to process an incoming short message addressed to the UICC.

3. The method of claim 1, wherein the scanning short message is sent from a device management system.

4. The method of claim 1, wherein the scanning short message is sent from the mobile device.

5. The method of claim 1, further comprising:
   determining that the response message includes a first non-zero value in a first cryptographic checksum field of the response message;
   in response to determining that the response message includes the first non-zero value, sending a second scanning short message to the UICC;
   receiving a second response message in response to the second scanning short message; and
   determining that the UICC is at risk to a key compromise attack based on the second response message.

6. The method of claim 1, wherein determining that the UICC is at risk to attacks comprises determining that the UICC is at risk to a premium rate attack, and the scanning short message includes a proof of receipt (PoR) field, wherein the PoR field is set to at least one of '01' or '10'.

7. A communication device, comprising:
   a memory; and
   at least one hardware processor communicatively coupled with the memory and configured to:
      send a scanning short message to a Universal Integrated Circuit Card (UICC) associated with a mobile device;
      receive a response short message in response to the scanning short message;
      determine that the UICC is at risk to attacks based on the response short message, wherein determining that the UICC is at risk to attacks comprises determining a type of attack that the mobile device is at risk to, and the type of attack is at least one of a premium rate attack or a key compromise attack; and
      in response to determining that the UICC is at risk to attacks, generate a notification, wherein generating the notification comprises at least one of sending the notification to a device management system or outputting the notification on the mobile device.

8. The communication device of claim 7, wherein the at least one hardware processor is further configured to:
   in response to determining that the UICC is at risk to attacks, install a firewall application on the mobile device, wherein the firewall application is configured to process an incoming short message addressed to the UICC.

9. The communication device of claim 7, wherein the scanning short message is sent from a device management system.

10. The communication device of claim 7, wherein the scanning short message is sent from the mobile device.

11. The communication device of claim 7, wherein the at least one hardware processor is further configured to:
   determine that the response message includes a first non-zero value in a first cryptographic checksum field of the response message;
   in response to determining that the response message includes the first non-zero value, send a second scanning short message to the UICC;
   receive a second response message in response to the second scanning short message; and
   determining that the UICC is at risk to a key compromise attack based on the second response message.

12. The communication device of claim 7, wherein determining that the UICC is at risk to attacks comprises determining that the UICC is at risk to a premium rate attack, and the scanning short message includes a proof of receipt (PoR) field, wherein the PoR field is set to at least one of '01' or '10'.

13. A tangible, non-transitory computer-readable medium containing instructions which, when executed, cause a computing device to perform operations comprising:
   sending a scanning short message to a Universal Integrated Circuit Card (UICC) associated with a mobile device;
   receiving a response short message in response to the scanning short message;

determining that the UICC is at risk to attacks based on the response short message, wherein determining that the UICC is at risk to attacks comprises determining a type of attack that the mobile device is at risk to, and the type of attack is at least one of a premium rate attack or a key compromise attack; and in response to determining that the UICC is at risk to attacks, generating a notification, wherein generating the notification comprises at least one of sending the notification to a device management system or outputting the notification on the mobile device.

14. The tangible, non-transitory computer-readable medium of claim 13, the operations further comprising:

in response to determining that the UICC is at risk to attacks, installing a firewall application on the mobile device, wherein the firewall application is configured to process an incoming short message addressed to the UICC.

15. The tangible, non-transitory computer-readable medium of claim 13, wherein the scanning short message is sent from at least one of a device management system or the mobile device.

16. The tangible, non-transitory computer-readable medium of claim 13, the operations further comprising:

determining that the response message includes a first non-zero value in a first cryptographic checksum field of the response message;

in response to determining that the response message includes the first non-zero value, sending a second scanning short message to the UICC;

receiving a second response message in response to the second scanning short message; and determining that the UICC is at risk to a key compromise attack based on the second response message.

17. The tangible, non-transitory computer-readable medium of claim 13, wherein determining that the UICC is at risk to attacks comprises determining that the UICC is at risk to a premium rate attack, and the scanning short message includes a proof of receipt (PoR) field, wherein the PoR field is set to at least one of '01' or '10'.

* * * * *